Figure 1:
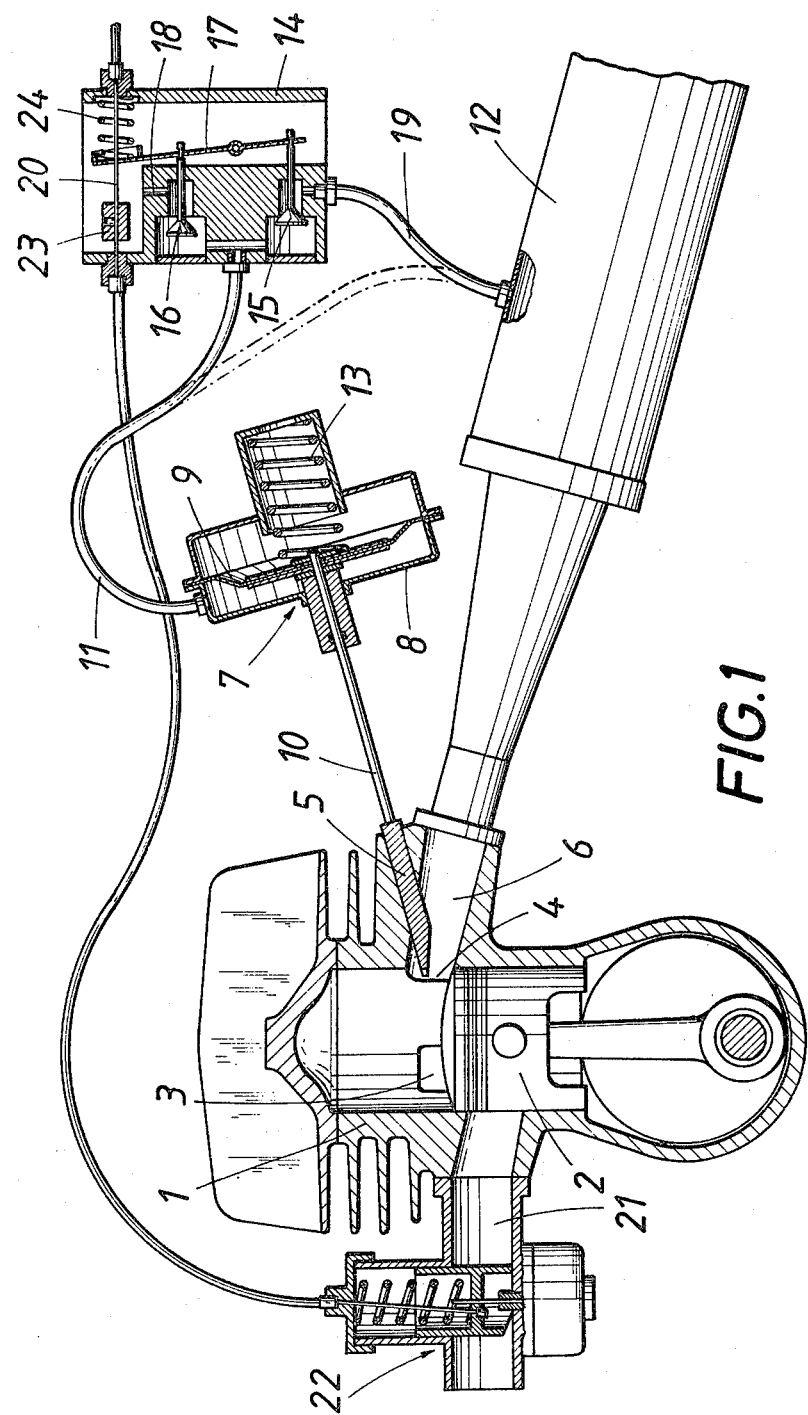

United States Patent [19]

Bostelmann

[11] 4,399,788
[45] Aug. 23, 1983

[54] INTERNAL COMBUSTION ENGINE COMPRISING MEANS FOR CONTROLLING THE AXIAL EXTENT OF AN EXHAUST PORT IN A CYLINDER

[75] Inventor: Willy Bostelmann, Wels, Austria

[73] Assignee: Bombardier-Rotax Gesellschaft mbH, Gunskirchen, Austria

[21] Appl. No.: 355,913

[22] Filed: Mar. 8, 1982

[30] Foreign Application Priority Data

Apr. 2, 1981 [AT] Austria .................................. 1528/81

[51] Int. Cl.³ .......................... F02D 9/06; F02D 7/00
[52] U.S. Cl. ................ 123/323; 123/65 PE; 123/393
[58] Field of Search .......... 123/393, 323, 324, 65 PE, 123/65 P

[56] References Cited

U.S. PATENT DOCUMENTS

| | | | |
|---|---|---|---|
| 1,462,945 | 7/1923 | Spiro | 123/393 |
| 4,121,552 | 10/1978 | Mithuo et al. | 123/65 PE |
| 4,333,431 | 6/1982 | Iio et al. | 123/65 PE |
| 4,364,346 | 12/1982 | Shiohara | 123/65 PE |

FOREIGN PATENT DOCUMENTS 183273  2/1955  Austria .

Primary Examiner—Wendell E. Burns
Attorney, Agent, or Firm—Kurt Kelman

[57] ABSTRACT

In a two-stroke cycle internal combustion engine, cylinder structure has an inside peripheral surface which defines a cylinder bore and is formed with an exhaust port, which has an axial extent along the axis of said cylinder bore and communicates with said exhaust system. A piston is axially reciprocable in said cylinder bore and adapted to open and close said port. A restricting member is mounted in said cylinder structure adjacent to said port and adjustable between a full-flow position, in which said restricting member exposes said exhaust port throughout its axial extent, and a restricting position, in which said restricting member restricts the axial extent of said exhaust port. A positioning drive is operatively connected to said restricting member and operable to adjust said restricting member between said full-flow and restricting positions. The positioning drive is adapted to be controlled in dependence on the exhaust gas pressure in said exhaust gas system.

7 Claims, 3 Drawing Figures

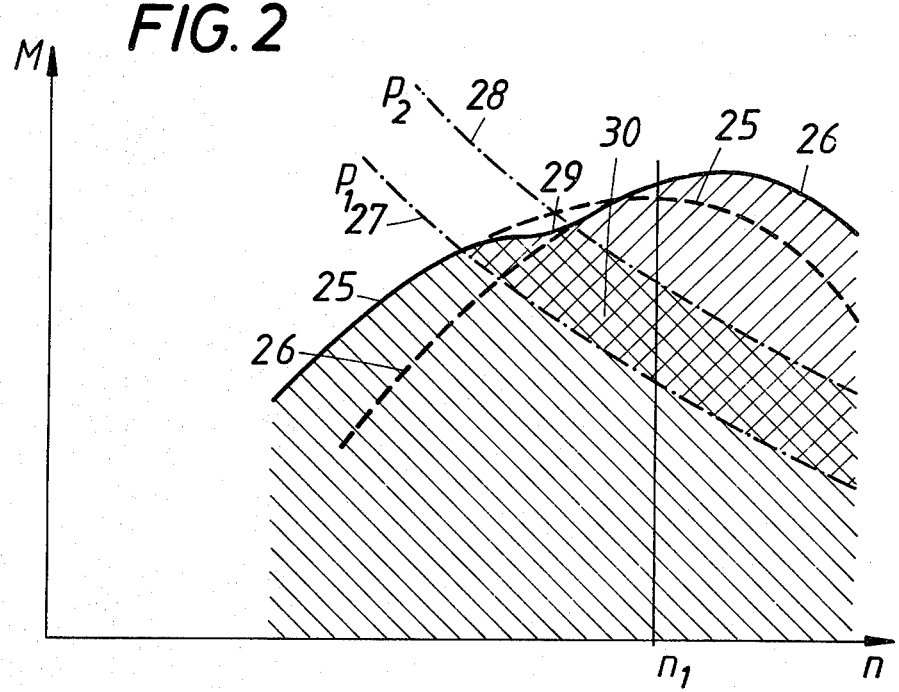
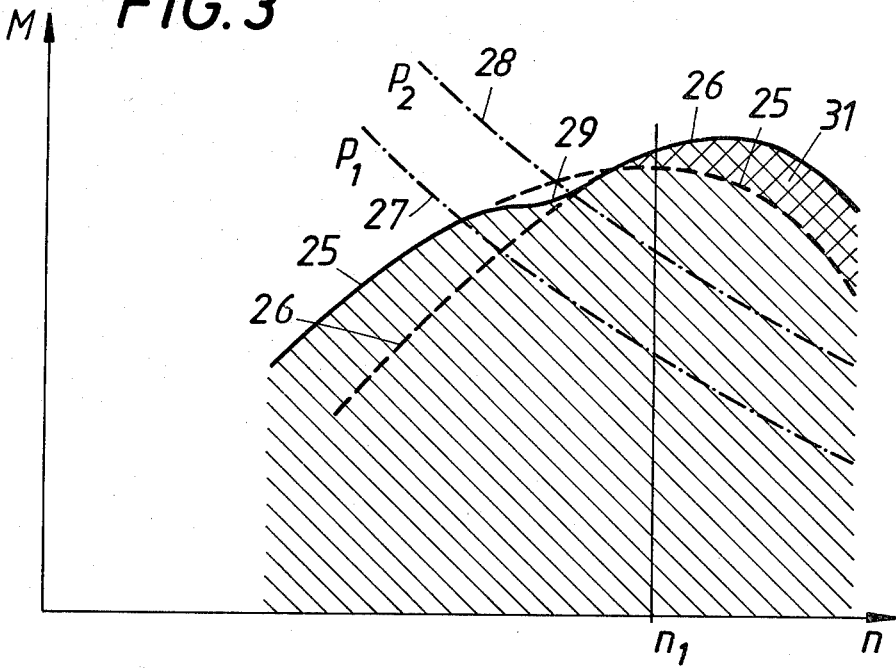

INTERNAL COMBUSTION ENGINE COMPRISING MEANS FOR CONTROLLING THE AXIAL EXTENT OF AN EXHAUST PORT IN A CYLINDER

This invention relates generally to an internal combustion engine comprising means for controlling the axial extent of an exhaust port formed in the peripheral surface of a cylinder bore. More specifically, the invention relates to a two-stroke-cycle internal combustion engine having at least one cylinder formed with an exhaust port, a piston which is reciprocable in said cylinder and adapted to open and close said exhaust port, an exhaust passage connected to the exhaust port, and means for adjusting the exhaust time, which means comprise a restricting member, which is adjustably mounted adjacent to the exhaust passage adjacent to said exhaust port and is adjustable to vary the effective height of said exhaust port and a positioning drive for adjusting said restricting member.

In order to ensure that two-stroke-cycle internal combustion engines can have a high power capacity at high speed, a high volumetric efficiency is required and the charge losses must be minimized. This can be accomplished by an early opening of the exhaust passage in conjunction with a utilization of resonance effects. But owing to the relatively large height of the exhaust port, that tuning of the exhaust system to the maximum power capacity of the internal combustion engine involves in the medium speed range not only an appreciable decrease of the useful stroke but also a large increase of the charge losses. As a result, the torque decreases so that the specific fuel consumption increases greatly. A higher torque in conjunction with a lower fuel consumption can be obtained at lower speeds only if the time for which the exhaust port is open is shortened.

For this purpose it is known to provide in the exhaust passage a restricting member, which at its end disposed adjacent to the exhaust port has a restricting edge which in the restricting position of the restricting member is generally flush with the peripheral surface of the cylinder bore. Said restricting member is adjustable to vary the effective height of the exhaust port so that the restricting member can be used to vary the exhaust time as is required under given conditions of operation of the engine. As the optimum position of the restricting member under given operating conditions will depend both on the speed of the engine and on the load on the engine, the positioning drive for adjusting the restricting member should be controlled in dependence on these two variables. This normally requires a relatively expensive control system.

It is an object of the invention to provide a two-stroke-cycle internal combustion engine which is of the type described first hereinbefore and comprises means for means for controlling the axial extent of the exhaust port in such a manner that the restricting member will be adjusted to its optimum position under given operating conditions without need for an expensive control system.

This object is accomplished according to the invention in that the positioning drive is adapted to adjust the restricting member in dependence on the exhaust gas pressure in the exhaust system which communicates with the exhaust port. The exhaust gas pressure in the exhaust system depends on the resistance to the flow of the exhaust gas in said system and changes with the speed of the engine and with the torque of the engine. For this reason the exhaust gas pressure in the exhaust system is a variable which depends on all parameters that are significant for the desired position of the restricting member and that variable can desirably be used to control the positioning drive for adjusting the restricting member. This simple control system is inexpensive and yet produces satisfactory results.

Experiments have shown that the at a given engine speed specific fuel consumption will be lower when the exhaust times are shorter than when they are longer. In order to ensure that the specific power consumption will be low when the engine is under a partial load, regardless of the speed of the engine, a further feature of the invention resides in that a switch is provided, which renders the positioning drive responsive to the exhaust gas pressure only when the engine is operating under full load so that during operation under partial load the restricting member will restrict the exhaust port to its smallest axial extent. Only when the throttle is fully opened for high torques will the positioning drive for adjusting the restricting member be activated so that the exhaust port will then be opened to its entire axial extent and the torque will thus be increased.

Various means may be used as a positioning drive for adjusting the restricting member in dependence on the exhaust gas pressure. A particularly simple control system will be obtained if the positioning drive comprises a diaphragm, to which the exhaust gas pressure is applied and which is biased by a return spring opposing the exhaust gas pressure, and said diaphragm is operatively connected to the restricting membe, e.g., by a suitable linkage. The return spring should preferably be under an adjustable initial stress and will determine for the exhaust gas pressure a threshold value at which the positioning drive is activated. The adjustment of the restricting member may be derived by means of a suitable linkage from the motion of the diaphragm to which the exhaust gas pressure is applied.

With such a positioning drive, the switch which activates the positioning drive in response to an entirely open throttle may consist of a directional control valve, which is incorporated in the passage through which the exhaust gas pressure is applied to the diaphragm. In the normal position of that valve, ambient air pressure is applied to the diaphragm. In the actuated position, the exhaust gas pressure is applied to the diaphragm. That directional control valve may preferably be actuated in dependence on the operation of the throttle control cable, which is provided for this purpose with a valve-actuating member. In response to a pull on the throttle control cable, the valve-actuating member will first perform a lost motion and when the throttle control cable is in the position in which the throttle is entirely open the valve-actuating member actuates the directional control valve to move the latter to the position in which the exhaust gas pressure is applied to the diaphragm so that the positioning drive can be controlled.

An engine embodying the invention is shown by way of example on the drawings, in which FIG. 1 is a simplified sectional view showing parts of a two-stroke-cycle internal combustion engines having means for varying the effective axial extent of an exhaust port in a cylinder, FIG. 2 is a graph showing a family of characterizing curves which represent the relationship of the torque of the engine to its speed to illustrate the results of a control of the effective axial extent of the exhaust port.

FIG. 3 is a graph that is similar to FIG. 2 and shows a family of characterizing curves which illustrate the results obtained with a control which operates only when the engine is operating under full load.

As is apparent from FIG. 1, the illustrated two-stroke-cycle internal combustion engine comprises a cylinder 1, which is formed with an inlet port 3 and an exhaust port 4, and a piston 2, which reciprocates in the cylinder 1 to control the ports 3 and 4. When the engine is operating at medium or low speeds, the exhaust port 4 should not be exposed too soon by the piston 2 as the latter is depressed by the expanding gases. Such a premature exposure of the exhaust port 4 is prevented by a restricting member 5, which is slidably mounted in a guide passage, which has a longitudinal direction that is approximately radial with respect to the bore of the cylinder 1 and extends at an acute angle to the axis of the exhaust passage 6, which communicates with the exhaust port 4.

A positioning drive 7 for adjusting the restricting member 5 comprises a diaphragm 9, which is gripped in a box 8 and engages a linkage 10, which is connected to the restricting member 5. A pressure-applying duct 11 is connected to the exhaust gas system 12 and is adapted to apply the exhaust gas pressure in the system 12 to the diaphragm 9. A return spring 13 opposes the action of the exhaust gas pressure on the diaphragm 9 and tends to move the restricting member 5 to its full-flow position. As the exhaust gas pressure in the exhaust system 12 increases, the diaphragm 9 retracts the restricting member 5 so that the effective axial extent of the exhaust port 4 and the exhaust time at a given speed of the engine will be increased.

The pressure-applying conduit 11 is connected to a switch 14, which consists of a directional control valve, which controls the communication between the positioning drive 7 and the exhaust system 12. For that purpose the valve 14 comprises two valve members 15 and 16, which are actuated by a locker lever 17 and may establish a communication between the diaphragm box 8, on the one hand, and an air supply duct 18 or a duct 19 connected to the exhaust system 12 on the other hand. The directional control valve is actuated by a throttle control cable 20, which controls the throttle valve of the carburetor 22 incorporated in the intake conduit 21. A valve-actuating member 23 is clamped on the cable 20 and when the latter is in its full-throttle position the valve-actuating member 23 acts on the rocker lever 17, which is bieased by a return spring 24. That means for actuating the switch ensure that the positioning drive 7 will not be responsive to the exhaust gas pressure in the exhaust system 12 unless the throttle is widely open.

As is apparent from FIGS. 2 and 3, the various positions of the restricting member 5, i.e., different axial extents of the exhaust port 4, will be associated with different characteristic curves. In accordance with the torque-speed characteristic 25, which will be applicable when the restricting member 5 restricts the axial extent of the exhaust port 4 as far as possible, the torque M which can be achieved at a medium or low speed n will be higher than when the restricting member 5 fully exposes the exhaust port 4. The torque-speed characteristic 26, which will be applicable when the exhaust port 4 is fully exposed, indicates that a higher torque will be obtained at high speeds. In order to ensure that the optimum torque will always be obtained, the exhaust port 4 must be exposed to a larger axial extent by the restricting member 5 as the speed increases. The restricting member 5 is adjusted in dependence on the exhaust gas pressure in the exhaust system 12. That exhaust gas pressure depends on the speed n and on the torque M. For this reason lines which indicate the relationship of torque and speed for a given exhaust gas pressure have been drawn in the graphs of FIGS. 2 and 3. These lines representing equal exhaust gas pressures are designated 27 and 28. The line 27 is applicable to the exhaust gas pressure $p_1$ which applies to the diaphragm 9 a force that is equal and opposite to the force that is due to the initial stress of the spring 13. The adjustment of the restricting member 5 toward its full-flow position will be initiated as soon as the exhaust gas pressure rises above $p_1$ and the restricting member 5 will fully expose the exhaust port 4 when the exhaust gas pressure has risen to $p_2$. It is apparent that the transition from the torque-speed characteristic 25 to the torque-speed characteristic 26 will take place between the pressures $p_1$ and $p_2$ associated with lines 27 and 28, respectively, as is indicated by the solid-line envelope 29.

When the engine is operated at a given speed $n_1$ under a partial load and the exhaust gas pressure is lower than $p_1$ (line 27) under the conditions represented in FIG. 2, the restricting member 5 will restrict the exhaust port 4 as far as possible. In response to a load increase, the conditions represented by the cross-hatched region 30 between the two lines 27 and 28 will be obtained and the restricting member 5 will be adjusted and will fully expose the exhaust port 4 when the exhaust gas pressure $p_2$ has been reached. The exhaust port 4 will be fully exposed at exhaust gas pressures above $p_2$.

The specific fuel consumption will be lower when the exhaust port 4 is restricted than when it is fully exposed. For this reason the exhaust port 4 should be restricted as far as possible regardless of the exhaust gas pressure when the engine is operating under partial load. For this purpose the switch 14 is provided, which permits an adjustment of the restricting member 5 toward its full-flow position only when the engine is operating under full load. In that case the graph of FIG. 3 will be applicable, which indicates that when the engine is running at a given speed $n_1$ the restricting member 5 will restrict the exhaust port as far as possible until conditions corresponding to the full-load curve have been reached. Only thereafter can the torque be increased, as is indicated by the cross-hatched region 31.

The initial stress and the spring constant of the return spring 13 can be selected so that exhaust gas pressures $p_1$ and $p_2$ will be obtained which result in an optimum envelope 29.

It will be understood that the switch 14 may be omitted if the axial extent of the exhaust port is to be adjusted also under partial load. In that case the pressure-applying duct 11 can be directly connected to the exhaust system 12, as is indicated in dotted lines in FIG. 1.

What is claimed is:

1. In a two-stroke cycle internal combustion engine comprising
   an exhaust system,
   cylinder structure having an inside peripheral surface which defines a cylinder bore and is formed with an exhaust port, which has an axial extent along the axis of said cylinder bore and communicates with said exhaust system,
   a piston, which is axially reciprocable in said cylinder bore and adapted to open and close said port, a restricting member, which is mounted in said cylinder structure adjacent to said port and adjustable between a full-flow position, in which said restricting member exposes said exhaust port throughout its axial extent, and a restricting position, in which said restricting member restricts the axial extent of said exhaust port, and a positioning drive operatively connected to said restricting member and operable to adjust said restricting member between said full-flow and restricting positions, said engine being operable to develop an exhaust gas pressure in said exhaust gas system, the improvement residing in that said positioning drive is adapted to be controlled in dependence on the exhaust gas pressure in said exhaust gas system.

2. The improvement set forth in claim 1, wherein said positioning drive comprises biasing means urging said restricting member toward said restricting position and means adapted to move said restricting member from said restricting position toward said full-flow position in response to an increase of said exhaust gas pressure in said exhaust system.

3. The improvement set forth in claim 2, as applied to an engine comprising throttle control means which are movable to a full-throttle position, wherein said positioning drive comprises means arranged to move said restricting member from said restricting position toward said full-flow position in response to an increase of said exhaust gas pressure in said exhaust system only when said throttle control means are in said full-throttle position.

4. The improvement set forth in claim 3, wherein a switch is provided which is arranged to be actuated in response to a movement of said throttle control means to said full-throttle position and said positioning drive comprises means arranged to move said restricting member from said restricting position toward said full-flow position in response to an increase of said exhaust gas pressure in said exhaust system only when said switch has thus been actuated.

5. The improvement set forth in claim 4, wherein said switch consists of a valve, which is arranged to establish a communication between said exhaust system and said positioning drive only when said accelerator is in said full-throttle position.

6. The improvement set forth in claim 5, as applied to an engine wherein said throttle control means comprise a control cable which is movable to a full-throttle position, wherein said throttle control cable carries a valve-actuating member which is arranged to cooperate with said valve and to cause said valve to establish a communication between said exhaust system and said positioning drive only when said throttle control cable is in said full-throttle position.

7. The improvement set forth in claim 1, wherein said positioning drive comprises a diaphragm, which is adapted to move said restricting member from said restricting position toward said full-flow position in response to an increase of the pressure applied to one side of said diaphragm, a biasing spring opposing the pressure applied to said one side of said diaphragm and a linkage connecting said diaphragm to said restricting member, and means are provided for applying the exhaust gas pressure in said exhaust system to said one side of said diaphragm.

* * * * *